(12) United States Patent
Liu (10) Patent No.: US 10,209,356 B2
(45) Date of Patent: Feb. 19, 2019

(54) METHOD AND SYSTEM FOR AUTOFOCUS RADAR IMAGING

(71) Applicant: Mitsubishi Electric Research Laboratories, Inc., Cambridge, MA (US)

(72) Inventor: Dehong Liu, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 486 days.

(21) Appl. No.: 14/950,378

(22) Filed: Nov. 24, 2015

(65) Prior Publication Data

US 2017/0146651 A1    May 25, 2017

(51) Int. Cl.
*G01S 13/89* (2006.01)

(52) U.S. Cl.
CPC ..................... *G01S 13/89* (2013.01)

(58) Field of Classification Search
CPC ........................................................ G01S 13/89
USPC ..................... 342/22, 25 E, 27, 175
See application file for complete search history.

(56) References Cited

U.S. PATENT DOCUMENTS

| | | | |
|---|---|---|---|
| 5,021,789 A | 6/1991 | Shaw | |
| 5,043,734 A | 8/1991 | Niho | |
| 5,943,006 A * | 8/1999 | Crane | G06T 3/4084 342/196 |
| 6,037,892 A * | 3/2000 | Nikias | G01S 13/9035 342/159 |
| 6,466,155 B2 * | 10/2002 | Taylor | G01S 7/14 342/159 |
| 6,518,915 B2 * | 2/2003 | Schutz | G01S 13/0209 340/541 |
| 6,781,541 B1 * | 8/2004 | Cho | G01S 13/9035 342/195 |
| 8,009,079 B2 * | 8/2011 | Connell | G01S 13/9011 342/25 A |
| 8,564,473 B2 * | 10/2013 | Bosser | G01S 13/90 342/179 |
| 2003/0222807 A1 * | 12/2003 | Cho | G01S 13/9011 342/25 R |

(Continued)

OTHER PUBLICATIONS

L. Liu, X. Bai, J. Zhao and R. Tao, "SAR Autofocus Using Wiener Deconvolution," 2010 First International Conference on Pervasive Computing, Signal Processing and Applications, Harbin, 2010, pp. 1256-1259. (Year: 2010).*

(Continued)

*Primary Examiner* — Marcus E Windrich
(74) *Attorney, Agent, or Firm* — Gene Vinokur; James McAleenan; Hironori Tsukamoto (57) ABSTRACT

An image of a region of interest (ROI) is generated by a radar system including a set of one or more antennas. The radar system has unknown position perturbations. Pulses are transmitted, as a source signal, to the ROI using the set of antennas at different positions and echoes are received, as a reflected signal, by the set of antennas at the different positions. The reflected signal is deconvolved with the source signal to produce deconvolved data. The deconvolved data are compensated according a coherence between the reflected signal to produce compensated data. Then, a procedure is applied to the compensated data to produce reconstructed data, which are used to reconstruct auto focused images.

9 Claims, 4 Drawing Sheets

(56) References Cited

U.S. PATENT DOCUMENTS

| | | | | |
|---|---|---|---|---|
| 2006/0109163 A1* | 5/2006 | Cho | ............ | G01S 13/90 |
| | | | | 342/25 R |
| 2006/0109164 A1* | 5/2006 | Cho | ............ | G01S 13/90 |
| | | | | 342/25 R |
| 2007/0285315 A1* | 12/2007 | Davis | ............ | G01S 3/74 |
| | | | | 342/377 |
| 2014/0232590 A1* | 8/2014 | Jin | ............ | G01S 13/5242 |
| | | | | 342/25 F |

OTHER PUBLICATIONS

A. Beck, P. Stoica, and J. Li. Exact and approximate solutions of source localization problems. IEEE trans. Signal Processing, 56(5):1770-1777, May 2008.

P. de Groen. An introduction to total least squares. Nieuw Archief voor Wiskunde, 14:237-253, Jul. 1996.

X. Liao, H. Li, and B. Krishnapuram. An M-ary KMP classifier for multi-aspect object classification. In Proc. IEEE Int. Conf. Acoustics, Speech, and Signal Processing (ICASSP), 2004.

N. O. Onhon and M. Cetin. A sparsity-driven approach for joint SAR imaging and phase error correction. IEEE Trans. Image Processing, 21(4):2075-2088, Apr. 2012.

J. A. Tropp, A. C. Gilbert, and M. J. Strauss. Simultaneous sparse approximation via greedy pursuit. In IEEE International conference on Acoustics Speech and Signal Processing(ICASSP), Mar. 2005.

L. Meier S. van de Geer and P. Bühlmann. The group lasso for logistic regression. Journal of the Royal Statistical Society: Series B (Statistical Methodology), 70:53-71, Feb. 2008.

* cited by examiner

Input: Compressed data $y_n$, ideal antenna location $r_n$, $K$.
Initialize: $l_{i_0} = l_0$, $\hat{\psi}_0$, $y_{res,0}^{(n)}(t)$, $\hat{x}_0$, $\epsilon$.

1: for $k = 1, 2, \ldots, K$ do
2:     Locate target at $l_{i_k}$ in the image $\hat{x}_{k-1}$.
3:     Update $\hat{\psi}_{i_k}^{(n)}$, $n = 1, 2, \ldots, N$ using (30).
4:     Compute two largest singular values $\sigma_{1,i_k}$ and $\sigma_{2,i_k}$ using (33), and $\hat{\phi}_{i_k}$ using (35).
5:     if $(\sigma_{1,i_k} - \sigma_{2,i_k})/\sigma_{1,i_k} < \epsilon$ then
6:        break
7:     end if
8:     Compute $\hat{x}_{i_k}$ using OMP using (37).
9:     Update antenna locations $\hat{r}_n$ by solving (38).
10:    Remove rotation and shift of antennas using (42).
11:    Reconstruct signal of uniform array $\hat{y}_k^{(n)}$ using (45).
12:    Reconstruct image $\bar{x}_6$ of detected targets using (46).
13:    Update residual signal $y_{res,k}^{(n)}(t)$ using (47).
14:    Generate residual image $\hat{x}_k$ using (48).
15: end for

Output: $\bar{x}_6$.

*FIG. 4*

METHOD AND SYSTEM FOR AUTOFOCUS RADAR IMAGING

FIELD OF THE INVENTION

This invention relates generally to radar imaging, and more particularly to autofocus radar imaging.

BACKGROUND OF THE INVENTION

To detect objects in a region of interest (ROI), radar antennas transmit pulses to illuminate the ROI, and receive reflected echoes for an imaging process. The received echoes can be approximated as a weighted sum of delayed versions of the transmitted pulses, with weights related to the reflectivities of the objects and delays related to the ranges of the objects relative to the antennas. Radar imaging is basically an inverse problem to solve for the weights and the delays given the transmitted pulses and the received echoes. When the locations of transmit and receive antennas are known, a simple delay-and-sum method can generate a well-resolved image of the ROI with a sufficient radar aperture size.

However, in radar applications, it is very common that the antenna locations are not known accurately due to environment interference or imprecise motion control of the radar platform. Although modern navigation systems such as Global Positioning System (GPS) can measure positions with high accuracy, the possible position errors are still beyond the requirement of high-resolution radar imaging.

For example, for vehicle mounted mono-static radar systems, as the vehicle is moving along some predesigned trajectory, position perturbations can be introduced due to non-smooth road surface or varying driving velocity. These position perturbations can be as large as several times the wavelength of the radar center frequency. In such situation, the virtual radar array is no longer uniform and the position errors need to be compensated in the imaging process. Otherwise, the objects to be detected are not focused, or even unresolvable when the position perturbations are greater than the wavelength of the central frequency. Therefore, it is desirable to perform autofocus imaging to achieve a well focused radar image especially when the antenna perturbations are relatively large.

Autofocus (AF) is a challenging problem in radar imaging as well as other array imaging applications using different sensor modalities. The existing AF methods can be roughly grouped into two categories. One is based on phase compensation, the other is based on position or motion compensation.

Phase-compensation based AF methods compensate data phases in terms of different merits, such as minimum entropy or least squares to generate a well-focused image. Phase-compensation based methods generally work well in compensating environment-induced phase distortion. However, for antenna position-induced phase error, which changes from object to object, simple phase-compensation cannot generate well focused image. In particular, when the area size of imaging domain increases, phase compensation methods can focus well at a particular area, but de-focus at other areas. Motion compensation based methods, on the other hand, seek to compensate for the position such that different position-induced phase errors can be corrected. However, it is difficult to achieve a global optimal solution in estimating antenna positions for AF imaging.

Compressive sensing (CS) based AF methods can concurrently perform AF imaging and compensate position errors by imposing sparsity of the image to be reconstructed. Because the position error is unknown, CS-based AF methods model the imaging problem as an optimization problem with a perturbed projection matrix. The corresponding optimal solution, however, is with error bound related to the position error. A global optimal solution is only achievable when the position error is much smaller than the wavelength, and with a good initialization. When the position errors are in the order of several wavelengths, those methods cannot converge to a focused image.

SUMMARY OF THE INVENTION

The embodiments of the invention provide a method and system for mono-static radar imaging with a radar system with unknown position perturbations up to several wavelengths. In order to improve the imaging performance, we provide a data-driven autofocus (AF) method to concurrently perform focused imaging and estimate unknown antenna positions. Compared to other prior art AF methods, which typically exhibit poor performance with large position errors, this AF method significantly improves the imaging performance even under perturbations up to ten times the wavelength of the radar center frequency, yielding a well-focused image for objects distributed in a ROI.

DETAILED DESCRIPTION OF THE PREFERRED EMBODIMENTS

The embodiments of our invention provide a method and system for mono-static radar imaging with a radar system with unknown position perturbations up to several wavelengths.

Data Acquisition Model and Inverse Imaging

Data Acquisition Model

Figure 1:
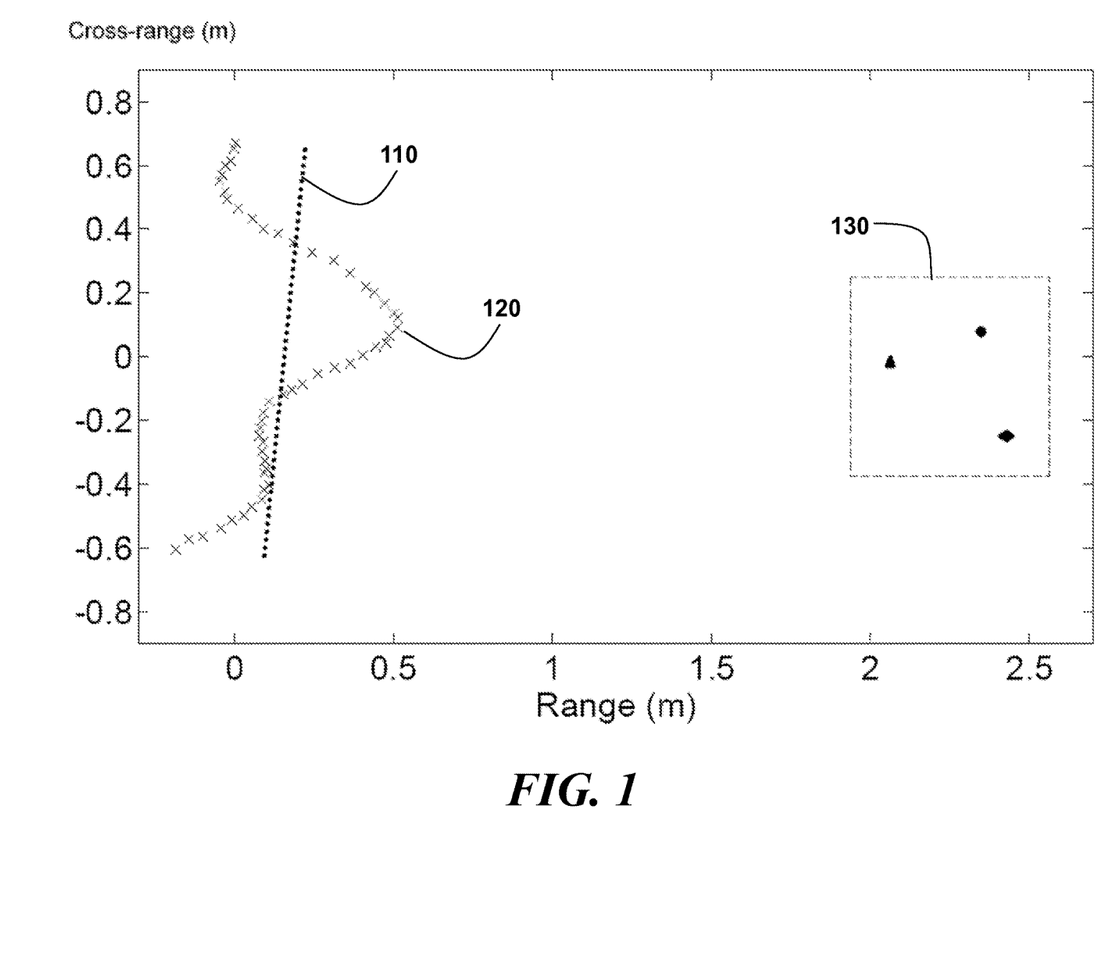
FIG. 1 is a schematic of an autofocus radar imaging setup according to embodiments of the invention.

As schematically shown in FIG. 1, we consider a 2D radar imaging application in which a mono-static radar system is moving along a predesigned trajectory to detect objects located in a region of interest (ROI). The radar system includes a set of antennas. The set can include one or more antennas. Each set of antennas can transmit pulses and receive echoes reflected, e.g., by objects located in the ROI. The pulses form a source signal, and the echoes form a reflected signal. Typically, one antenna transmits the pulses, and one or more antennas receive the echoes.

For simplicity, we assume that the radar system is moving in a straight line so that the system performs as a linear uniform virtual array, represented by dots 110. Equivalently, we can also have multiple physical antennas of a radar system distributed along a straight line at not well calibrated locations. The x-marks 120 represent the actual true antenna positions due to unknown position perturbations. Three objects with shapes of triangle, circle, and diamond are randomly located in the region of interest (ROI) 130.

Figure 2A:
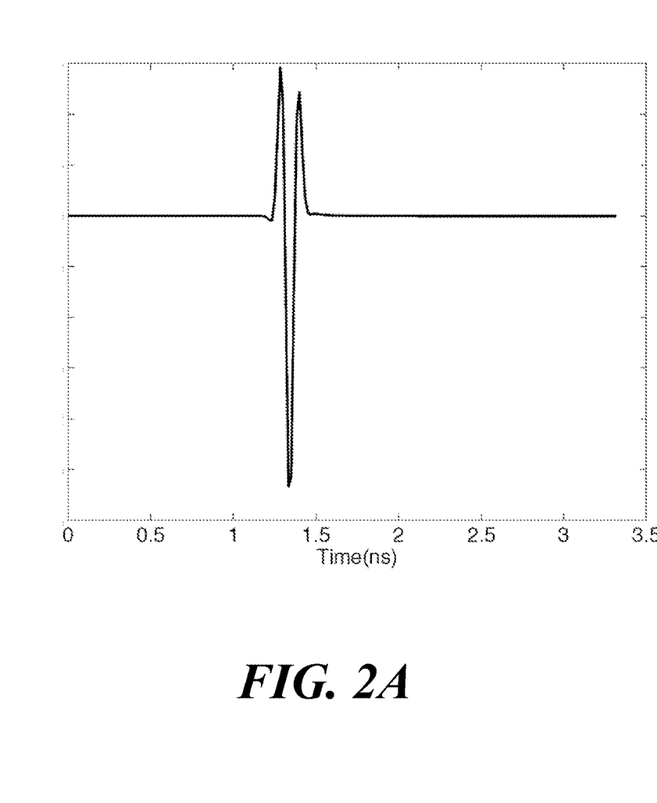
FIGS. 2A and 2B are diagrams of a radar pulse in time and frequency domains according to embodiment of the invention.
Figure 2B:
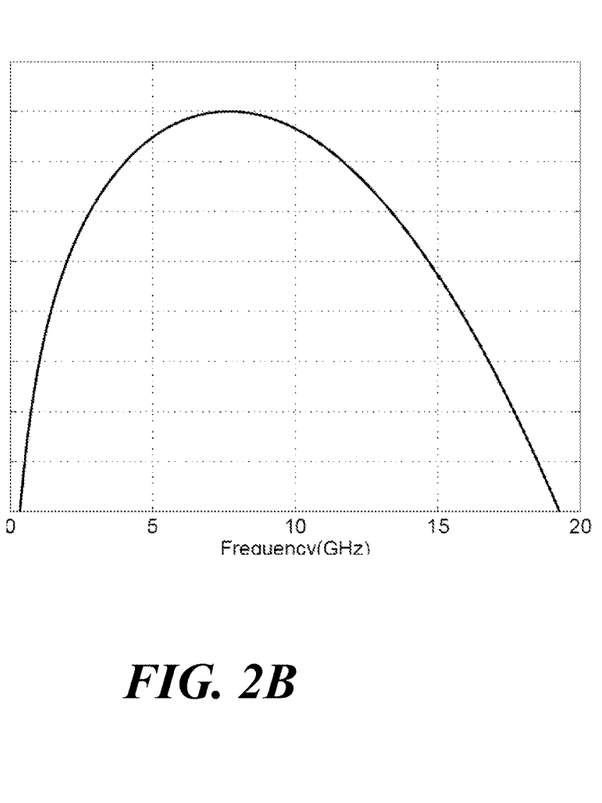

FIGS. 2A and 2B respectively show a pulse in the time domain and the frequency domain. We use p(t) to denote the time-domain pulse emitted by the mono-static radar antennas. In the frequency domain, the pulse can be expressed as $$P(\omega) = \int_{\mathbb{R}} p(t) e^{-j\omega t} t, \quad (1)$$

where ω represents the phase, and t represents time.

For a localized object at $l_i$, where i=1, 2, ..., I, and I is a number of pixels in the image of the ROI, the corresponding scattered field received by the $n^{th}$ antenna positioned at $r'_n$ due to the excitation signal transmitted by the $n^{th}$ transmitter antenna located at $r_n$ is $$Y_i(\omega, r_n, r'_n) = P(\omega) S(\omega, l_i) G(\omega, l_i, r_n) G(\omega, r'_n, l_i) + o_i, \quad (2)$$

where n=1, 2, ..., N and N is the number of antennas, $S(\omega, l_i)$ is the complex-valued scattering field of the object at location $l_i$ for impulse excitation, $o_i$ is received noise corresponding to the object at $l_i$, and $G(\omega, l_i, r_n)$ is the Green's function from $l_i$ to $r_n$ which can be represented by $$G(\omega, l_i, r_n) = a(r_n, l_i) e^{-j\omega \frac{\|r_n - l_i\|}{c}}, \quad (3)$$

where $a(r_n, l_i)$ represents magnitude attenuation caused by antenna beampattern and pulse propagation between $r_n$ and $l_i$, and $$e^{-j\omega \frac{\|r_n - l_i\|}{c}}$$

presents the phase change of reflected signal relative to the source signal after propagating distance $\|r_n - l_i\|$ at velocity c. We assume the velocity of the radar system is much slower than c such that its displacement from $r_n$ to $r'_n$ can be neglected without degrading the imaging performance, i.e., $r'_n = r_n$. Therefore, the reflected signal at a discrete frequency $\omega_m$ (m=1, 2, ..., M), due to the object located at $l_i$, can be expressed as $$Y_i(\omega_m, r_n) = P(\omega_m) S(\omega_m, l_i) a^2(r_n, l_i) e^{-j\omega_m \frac{2\|r_n - l_i\|}{c}}, \quad (4)$$

where we omit a noise term for simplicity.

The overall reflected signal can be modeled as a superposition of the echoes reflected by all objects located in the ROI as $$Y(\omega_m, r_n) = \sum_{i=1}^{I} Y_i(\omega_m, r_n)$$

$$= \sum_{i=1}^{I} P(\omega_m) S(\omega_m, l_i) a^2(r_n, l_i) e^{-j\omega_m \frac{2\|r_n - l_i\|}{c}}. \quad (5)$$

By de-convolving the reflected signal with the source signal, a compressed reflected signal is $$\bar{Y}(\omega_m, r_n) = \sum_{i=1}^{I} \bar{Y}_i(\omega_m, r_n)$$

$$= \sum_{i=1}^{I} \|P(\omega_m)\|^2 S(\omega_m, l_i) a^2(r_n, l_i) e^{-j\omega_m \frac{2\|r_n - l_i\|}{c}}. \quad (6)$$

Let $$Y^{(n)} = [\bar{Y}(\omega_1, r_n), \bar{Y}(\omega_2, r_n), \ldots, \bar{Y}(\omega_M, r_n)]^T \quad (7)$$

be a vector of discretized frequency components of the compressed reflected signal received by the $n^{th}$ antenna, in which the part corresponding to the $i^{th}$ object at location $l_i$ is $$y_i^{(n)} = \begin{bmatrix} \|P(\omega_1)\|^2 S(\omega_1, l_i) a^2(r_n, l_i) e^{-j\omega_1 \frac{2\|r_n - l_i\|}{c}} \\ \|P(\omega_2)\|^2 S(\omega_2, l_i) a^2(r_n, l_i) e^{-j\omega_2 \frac{2\|r_n - l_i\|}{c}} \\ \vdots \\ \|P(\omega_M)\|^2 S(\omega_M, l_i) a^2(r_n, l_i) e^{-j\omega_M \frac{2\|r_n - l_i\|}{c}} \end{bmatrix}$$

$$= a^2(r_n, l_i) \sum_{m=1}^{M} \|P^2(\omega_m) S(\omega_m, l_i)\|^2.$$

$$\begin{bmatrix} \frac{\|P(\omega_1)\|^2 S(\omega_1, l_i)}{\sum_{m=1}^{M} \|P^2(\omega_m) S(\omega_m, l_i)\|^2} \\ \frac{\|P(\omega_2)\|^2 S(\omega_2, l_i)}{\sum_{m=1}^{M} \|P^2(\omega_m) S(\omega_m, l_i)\|^2} \\ \vdots \\ \frac{\|P(\omega_M)\|^2 S(\omega_M, l_i)}{\sum_{m=1}^{M} \|P^2(\omega_m) S(\omega_m, l_i)\|^2} \end{bmatrix} \circ \begin{bmatrix} e^{-j\omega_1 \frac{2\|r_n - l_i\|}{c}} \\ e^{-j\omega_2 \frac{2\|r_n - l_i\|}{c}} \\ \vdots \\ e^{-j\omega_M \frac{2\|r_n - l_i\|}{c}} \end{bmatrix}, \quad (8)$$

where the symbol ○ represents an element-wised product of two vectors or two matrices. To simplify the above expression, let $$x_i^{(n)} = a^2(r_n, l_i) \Sigma_{m=1}^{M} \|P^2(\omega_m) S(\omega_m, l_i)\|^2, \quad (9)$$

$$\phi_i = \begin{bmatrix} \frac{\|P(\omega_1)\|^2 S(\omega_1, l_i)}{\sum_{m=1}^{M} \|P^2(\omega_m S(\omega_m l_i)\|^2} \\ \frac{\|P(\omega_2)\|^2 S(\omega_2, l_i)}{\sum_{m=1}^{M} \|P^2(\omega_m) S(\omega_m, l_i)\|^2} \\ \vdots \\ \frac{\|P(\omega_M)\|^2 S(\omega_M, l_i)}{\sum_{m=1}^{M} \|P^2(\omega_m) S(\omega_m, l_i)\|^2} \end{bmatrix}, \quad (10)$$

and $$\psi_i^{(n)} = \begin{bmatrix} e^{-j\omega_1 \frac{2\|r_n - l_i\|}{c}} \\ e^{-j\omega_2 \frac{2\|r_n - l_i\|}{c}} \\ \vdots \\ e^{-j\omega_M \frac{2\|r_n - l_i\|}{c}} \end{bmatrix}. \quad (11)$$

Combining (8-11), we rewrite (7) as $$y^{(n)} = \Sigma_{i=1}^{I} y_i^{(n)} = \Sigma_{i=1}^{I} x_i^{(n)} \cdot \phi_i \circ \psi_i^{(n)} = (\Phi \circ \Psi^{(n)}) x^{(n)} = \Gamma^{(n)} x \quad (12)$$

where $\Gamma^{(n)}$ is a projection matrix of the $n^{th}$ antenna with the $i^{th}$ column vector being $y_i^{(n)} = \phi_i \circ \psi_i^{(n)}$, and $x^{(n)}$ is a vector of scattering coefficients. Note that the vector $\phi_i$ is a object signature vector independent of antennas, representing the frequency spectrum of the impulse response of the $i^{th}$ object. The vector $\psi_i^{(n)}$ reflects the phase changes due to propagation distance $\|r_n - l_i\|$ at velocity c.

In practice, the antenna positions are perturbed with unknown position errors, as shown the x-marks 120 in FIG. 1. Let the $n^{th}$ perturbed antenna position be $$\tilde{r}_n = r_n + \varepsilon_n, \quad (13)$$

where $\varepsilon_n$ is unknown position perturbation of the $n^{th}$ antenna.

To unify the symbols in this description, we use letters to denote parameters of ideal positions, while letters with symbol ~ to denote parameters of perturbed positions, and letters with symbol ^ to denote reconstructed parameters. Similar to (12), the actual reflected signal, interfered by noise, can be presented in matrix-vector form as $$\tilde{y}^{(n)} = \tilde{\Gamma}^{(n)} \tilde{x}^{(n)} + \tilde{\delta}^{(n)}, \quad (14)$$

where $\tilde{\delta}^{(n)}$ is a vector of the noise spectrum.

Delay-and-Sum Imaging

The image formation process generates the image of the ROI given the reflected signal $\tilde{y}(n)$ with $n=1, \ldots, N$. A number of imaging methods are available. However, most methods require a uniform array for fast imaging process. Therefore, we use a conventional delay-and-sum imaging method, which is suitable for both uniform and non-uniform arrays.

When the antennas are arranged uniformly with exact known positions $r_n$, the inverse imaging problem can be approximately solved by coherently summing N images generated by the delay-and-sum method $$\bar{x}_1 = \sum_{n=1}^{N} \bar{x}_1^{(n)} = \sum_{n=1}^{N} (\Psi^{(n)})^H y^{(n)}, \quad (15)$$

where $\Psi^{(n)}$ is a M×I matrix whose $i^{th}$ column is $\psi_i^{(n)}$, as indicated in (11), and the superscript H represents a Hermitian transpose.

For a perturbed antenna array, if we know the exact positions $\tilde{r}_n$, the image is reconstructed as $$\bar{x}_2 = \sum_{n=1}^{N} \bar{x}_2^{(n)} = \sum_{n=1}^{N} (\tilde{\Psi}^{(n)})^H \tilde{y}^{(n)}, \quad (16)$$

where $\tilde{\Psi}^{(n)}$ is the same as $\Psi^{(n)}$ in expression except that $r_n$ is replaced by $\tilde{r}_n$.

For antenna positions $\tilde{r}_n$ not known exactly, one can ignore the position perturbations in the imaging process by treating the perturbed antenna array as a uniform array. The corresponding image is then reconstructed as $$\bar{x}_3 = \sum_{n=1}^{N} \bar{x}_3^{(n)} = \sum_{n=1}^{N} (\Psi^{(n)})^H \tilde{y}^{(n)}. \quad (17)$$

The corresponding delay-and-sum imaging processes with known antenna positions as in (15) and (16) are match filtering process, while that with unknown antenna positions in (17) is a mismatched filtering process. The mismatched filtering process generally yields a defocused image with image quality related to the position perturbations. The larger the position perturbations, the less focused the image. For perturbations up to ten times the center wavelength, the objects cannot be resolved. Therefore it is necessary to provide an automatic focusing method to concurrently estimate the perturbation errors and perform focused imaging, especially when the perturbations is relatively large.

Data-Driven Autofocus Imaging Method

Sparsity and Coherence

In order to detect objects effectively, we provide a data-driven AF method with data coherence analysis and sparsity constraint on the image to be reconstructed.

Without loss of generality, we assume there are up to K localized objects, each with a single scattering center in the ROI. To reconstruct the image of the localized objects, we try to solve the following optimization problem $$\min_{x^{(n)}} \sum_{n=1}^{N} \|\tilde{y}^{(n)} - (\Phi \circ \Psi^{(n)}) x^{(n)}\|_2^2, \, s.t. |\Sigma_{n=1}^{N} x^{(n)}|_0 < K, \quad (18)$$

where $n = 1, 2, \ldots, N$.

Let $l_{i_k}$ be the location of the $k^{th}$ object, where $i_k \in \{1, \ldots, I\}$ is the corresponding pixel index in the image-domain. Although the scattering coefficient vectors $\tilde{x}^{(n)}$ in (14) are different from antenna to antenna, the coefficients share the same support of non-zero entries. This is similar to the group sparsity problem of compressive sensing, where all unknown vectors share identical non-zero support but with different values. However, the AF problem we are trying to solve here is more general than the group sparsity problem because the projection matrices are not the same for all antennas, although related to each other. The relationship between the projection matrices is exploited by coherence analysis.

As described above, the $i^{th}$ column vector $y_i^{(n)}$ of projection matrix $\tilde{\Gamma}^{(n)}$ is an element-wised product of two vectors $\phi_i$ and $\psi_i^{(n)}$. Vector $\phi_i$ stores the scattering signature of the $i^{th}$ object in the frequency domain. Vector $\tilde{\psi}_i^{(n)}$ stores phase changes related to the distance $\|\tilde{r}_n - l_i\|$. Although these projection matrices of different antennas are different from each other, their corresponding column vectors are coherent across antennas by sharing the same object signature $\phi_i$, if the phase change term $\tilde{\psi}_i^{(n)}$ is properly compensated.

The idea of our AF method is that for any object, we determine a time delay for each antenna signal such that the corresponding signals measured by different antennas are most coherent to each other after time compensation. Our AF method is realized by iteratively exploiting object location $l_{i_k}$, compensating the corresponding phase change term $\tilde{\psi}_{i_k}^{(n)}$, extracting object signature $\phi_{i_k}$, and estimating scattering coefficients $\tilde{x}_{i_k}^{(n)}$.

Initial Position Error Compensation

Because the objects cannot be resolved due to large antenna position perturbations, a preprocess with initial position error compensation is necessary to ensure the signals are approximately aligned. We first initialize the antenna positions by analyzing coherence of the reflected signs received by adjacent antennas. Based on the theoretical analysis and experiments on radar imaging in Rayleigh scattering regime, the coherence of data collected by two antennas in inhomogeneous media decreases with the increase of distance between the two antennas. As the distance increases to a certain value, also termed decoherence length, the two data sets become uncorrelated to each other. This decoherence length is related to radar frequency, propagation distance, and inhomogeneity of the media.

For two adjacent antennas at distances $\|\tilde{r}_n - \tilde{r}_{n+1}\| \ll \|\tilde{r}_n - l_i\|$, it is reasonable to assume that their distance is small enough to be within the decoherence length, although their offsets to the ideal array can be greater than several wavelengths. Therefore, the reflected signals received by two adjacent antennas are highly coherent to each other. In other words, in the time domain the two signals are very similar to each other, but with a time shift. This time shift can be effectively estimated by determining the cross-correlation (CC) between the two compressed time-domain echoes. The maximum of the cross-correlation function indicates the point in time where the signals are best aligned. Equivalently, the time-domain cross-correlation can be determined in the frequency domain using the inverse Fourier transform as $$\tilde{\tau}_{n,n+1} = \text{argmax}_\tau \int y(t, \tilde{r}_n) \cdot y(t+\tau, \tilde{r}_{n+1}) dt =$$
$$\text{argmax}_\tau \mathcal{F}^{-1}\{(\tilde{y}^{(n)})^* \circ \tilde{y}^{(n+1)}\}, \quad (19)$$

where $y(t, \tilde{r}_n)$ is the corresponding time-domain signal of $\tilde{r}^{(n)}$, the superscript * represents a conjugate process, and $\mathcal{F}^{-1}$ represents the inverse Fourier transform.

Let $\hat{\tau}_0^{(n)}$ represent the unknown round trip pulse propagation time between $\tilde{r}_n$ and $l_0$, where $l_0$ is the center of the ROI. Then, we have the following approximations $$\hat{\tau}_0^{(n+1)} - \hat{\tau}_0^{(n)} \approx \tilde{\tau}_{n,n+1}, \text{ for } n=1,\ldots,N-1. \quad (20a)$$

For unknown $\hat{\tau}_0^{(n)}$, n=1, 2, ..., N, the above problem is underdetermined because there are only N−1 equations but N unknowns. To make the problem determinable, we consider another constraint which assumes the total propagation time is the same as for an ideal uniform array, i.e., $$\sum_{n=1}^{N} \hat{\tau}_0^{(n)} = \sum_{n=1}^{N} \frac{2\|r_n - l_0\|}{c}, \quad (20b)$$

With N equations in (20a) and (20b), it is straight forward to determine $\hat{\tau}_0^{(n)}$ for n=1, ..., N. Based on the solution, we have initial distance compensated data $$\hat{y}_0^{(n)} = \tilde{y}^{(n)} \circ (\hat{\psi}_0^{(n)})^* \circ \psi_0^{(n)}, \quad (21)$$

where $$\hat{\psi}_0^{(n)} = \begin{bmatrix} e^{-j\omega_1 \hat{\tau}_0^{(n)}} \\ e^{-j\omega_2 \hat{\tau}_0^{(n)}} \\ \vdots \\ e^{-j\omega_M \hat{\tau}_0^{(n)}} \end{bmatrix}, \quad (22)$$

and $\psi_0^{(n)}$ has the same expression as $\tilde{\psi}_0^{(n)}$ in (22) except that $\hat{\tau}_0^{(n)}$ is replaced by $$\tau_0^{(n)} = \frac{2\|r_n - l_0\|}{c}.$$

The initial image with compensated data is reconstructed by $$\bar{x}_4 = \Sigma_{n=1}^{N} (\Psi^{(n)})^H \hat{y}_0^{(n)}. \quad (23)$$

The initial compensation process in (21) is similar to sub-aperture AF when each sub-aperture is composed of a single antenna. With initial distance compensation, the compensated data in (21) is synchronized at the ROI center. If there is a object at the center of the ROI, it is well focused in the image according to (23). However, for off-center objects, because the phase changes are different from location to location, the image can be out of focus. In order to focus at objects at different positions, we use the following iterative method.

Iterative Object Localization and Coherent Signal Extraction

We iteratively determine an object location, compensate the corresponding phase changes, extract the object signal, and then perform imaging on residual data for the next iteration. To begin with, we first initialize the residual signal as the time domain signals measured by perturbed antennas $$y_{res,0}^{(n)}(t) = y(t,\tilde{r}_n). \quad (24)$$

and initial image $\hat{x}_0 = \bar{x}_4$ indicated in (23).

Assume that at the $k^{th}$ iteration, we have a reconstructed image $\hat{x}_{k-1}$ using residual data $y_{res,k-1}^{(n)}(t)$, based on which a new object is detected at location $l_{i_k}$ where the maximum absolute value of $\hat{x}_{k-1}$ is observed, i.e., $$i_k = \text{argmax}_i \hat{x}_{k-1}(i). \quad (25)$$

Given $l_{i_k}$, the corresponding object response for each antenna is extracted by a time gating process $$\hat{y}_{i_k}^{(n)}(t) = W_{i_k}(y_{res,k-1}^{(n)}(t - \hat{\tau}_0^{(n)} + \tau_0^{(n)})), \quad (26)$$

where $W_{i_k}$ is a time-gating function with time-gate centered at $$t = \frac{2\|r_n - l_{i_k}\|}{c}$$

to filter out signals not associated to the $(i_k)^{th}$ object. It is clear that the time gating process in (26) is just an approximation based on propagation time. The time-gated signal needs further process to represent the corresponding object signal. To this end, we take the $$\left(\frac{N}{2}\right)^{th}$$

antenna as a reference, or $$\left(\frac{N+1}{2}\right)^{th}$$

antenna when N is an odd integer, and align the extracted signal in (26) with time shift estimated by CC similar to (18)

$$\hat{\tau}_{n,\frac{N}{2}} = \text{argmax}_\tau \int \hat{y}_{i_k}^{(n)}(t) \cdot \hat{y}_{i_k}^{(\frac{N}{2})}(t+\tau)dt = \text{argmax}_\tau \mathcal{F}^{-1}\left\{(\hat{y}_{i_k}^{(n)})^* \circ \hat{y}_{i_k}^{(\frac{N}{2})}\right\}, \quad (27)$$

Similar to (19) and (20), we have the following equations to solve for unknown time shifts $\hat{\tau}_{i_k}^{(n)}$ (n=1, 2, ..., N) of signals in (26) such that the signals are coherent at $l_{i_k}$, $$\begin{cases} \hat{\tau}_{i_k}^{(n)} - \hat{\tau}_{i_k}^{(\frac{N}{2})} = \hat{\tau}_{n,\frac{N}{2}}, \text{ for } n \neq N/2 \\ \sum_{n=1}^{N} \hat{\tau}_{i_k}^{(n)} = 0 \end{cases} \quad (28)$$

The aligned signal can be represented by $$\bar{y}_{i_k}^{(n)} = \hat{y}_{i_k}^{(n)} \circ (\hat{\psi}_{i_k}^{(n)})^*, \quad (29)$$

where $$\hat{\psi}_{i_k}^{(n)} = \begin{bmatrix} e^{-j\omega_1 \hat{\tau}_{i_k}^{(n)}} \\ e^{-j\omega_2 \hat{\tau}_{i_k}^{(n)}} \\ \vdots \\ e^{-j\omega_M \hat{\tau}_{i_k}^{(n)}} \end{bmatrix}, \quad (30)$$

By combining all aligned signals, we form a matrix composed of column vectors corresponding to the same object but collected by different antennas $$Y_{i_k}[\bar{y}_{i_k}^{(1)}, \bar{y}_{i_k}^{(2)}, \ldots, \bar{y}_{i_k}^{(N)}]. \quad (31)$$

The object signature is then extracted by minimizing the following objective function $$E_{i_k} = \text{argmin}_E \|Y_{i_k} - E\|_F^2 \ s.t. \text{rank}(E) = 1, \quad (32)$$

which can be solved by singular value decomposition (SVD) on $Y_{i_k}$ [5]. Let the SVD of $Y_{i_k}$ be $$Y_{i_k} = U_{i_k} \Sigma_{i_k} V_{i_k}^H. \quad (33)$$

We have $$E_{i_k} = \sigma_{1,i_k} u_{1,i_k} v_{1,i_k}^H, \quad (34)$$

where $\sigma_{1,i_k}$ is the largest singular value of $Y_{i_k}$, $u_{1,i_k}$ is the corresponding left singular vector representing antenna pattern, and $v_{1,i_k}^H$ is the corresponding right singular vector representing object signature, i.e., $$\hat{\phi}_{i_k} = v_{1,i_k}. \quad (35)$$

Because $Y_{i_k}$ represents signals of a single object for different antennas, ideally it has only one dominant singular value for a noise-free signal. For a noisy signal, the largest singular value $\sigma_{1,i_k}$ related to target strength is expected be much larger than the second largest singular value $\sigma_{2,i_k}$ related to background noise level. When there is no object in the ROI, $Y_{i_k}$ represents noise of clutter background. In such situation, there is no dominant singular value and the singular value spectrum is relatively flat. Therefore, we set the ratio between the two largest singular values as a stop criteria in the iterative method to determine whether there is one (more) object or not.

Given the basis vector $\hat{\phi}_{i_k}$ and distance compensation vector $\hat{\psi}_{i_k}$, the problem becomes a general basis pursuit problem. If we define an M×k projection matrix $$\hat{\Gamma}_k^{(n)} = [\hat{\phi}_{i_1} \circ \hat{\psi}_{i_1}^{(n)} \circ \hat{\psi}_0^{(n)}, \ldots, \hat{\phi}_{i_k} \circ \hat{\psi}_{i_k}^{(n)} \circ \hat{\psi}_0^{(n)}], \quad (36)$$

then the scattering coefficients can be determined by an orthogonal matching pursuit (OMP) method $$\hat{x}_k^{(n)} = (\hat{\Gamma}_k^{(n)})^\dagger \tilde{y}^{(n)}, \quad (37)$$

where $\hat{x}_k^{(n)}$ is a k-dimensional vector representing scattering strength of detected k objects and the superscript † denotes the pseudo-inverse operation. For sequential basis, the pseudo-inverse of $\hat{\Phi}_k^{(n)}$ can be efficiently determined by making using (n of the pseudo-inverse of $\hat{\Gamma}_{k-1}^{(n)}$ [7].

Antenna Position Estimation

At the $k^{th}$ iteration, a total of k objects are located. Based on the distances between each antenna and the detected objects, we can determine the antenna positions. It is also reasonable to have more accurate antenna locations with more distance constraints. However, as the number of object increases, the object strength decreases. In some instances, the newly detected object is a false alarm, i.e., it does not correspond to any object. Consequently, this false alarm deteriorates the accuracy of antenna locations.

To address this, we use a weighting scheme such that the stronger scattering objects weight more than weaker scattering objects. Therefore, we determine the $n^{th}$ antenna location by minimizing the following cost function $$\hat{r}_k^{(n)} = \text{argmin}_r \left| \left\langle r - r_n, \frac{r_{n+1} - r_n}{\|r_{n+1} - r_n\|} \right\rangle \right|^2 + \sum_{k'=1}^k |\hat{x}_k^{(n)}(k')| \left( \|r - l_{i_k}\| - \frac{(\hat{\tau}_0^{(n)} + \hat{\tau}_{i_k}^{(n)}) c}{2} \right)^2. \quad (38)$$

The above optimization problem is composed of two terms. The first term minimizes an azimuth shift of the perturbed antenna from its ideal position. The second term restricts the distance in the range direction according to the propagation time with weight $|\hat{x}_k^{(n)}(k')|$ determined according to (37). When there is only one object, i.e., k=1, the first term guarantees a unique solution for this optimization problem. While it is desirable to determine the antenna locations according to (38), the cost function is non-convex. Therefore, there is no guarantee to produce a global optimal solution. However, a global optimal solution can be achieved with a good initialization.

It is important to note that the antenna locations are based on distance measurements and distance measurements are translation and rotation invariant. Therefore, when there is an error introduced to the object location, all the antenna locations are biased. In order to remove the translation and rotation effect of distance measurements, we put constraint on the orientation and translation of the perturbed array by assuming that the mean and orientation of the actual array are the same as the ideal uniform array.

When the antenna locations are estimated by (38), we perform linear translation and rotation transform on the estimated antenna positions to align with the ideal linear array. Concurrently, we perform the same transform on the estimated object locations such that the distances between the antennas and objects do not change. The linear translation $\bar{\rho}$ can be determined as $$\rho = \frac{1}{N} \sum_{n=1}^N r_n - \frac{1}{N} \sum_{n=1}^N \hat{r}_k^{(n)}, \quad (39)$$

and the rotation angle θ is the angle between the ideal antenna direction and the dominant direction of estimated antenna locations $$\theta = \angle(r_{n+1} - r_n) - \angle \Delta_r, \quad (40)$$

where $\Delta_r$ is a unit vector in the dominant direction, which can be achieved by solving the following problem using principal component analysis, $$\Delta_r = \text{argmin}_{\Delta_r} \sum_n \|\hat{r}_k^{(n)} - \langle \Delta_r, \hat{r}_k^{(n)} \rangle \Delta_r \|, \ s.t. \|\Delta_r\| = 1. \quad (41)$$

Correspondingly, we translate and rotate estimated object locations as following such that the distance measurements do not change.

$$\begin{cases} \hat{r}_k^{(n)} \leftarrow T_\theta(\hat{r}_k^{(n)} - \hat{r}_k^{(c)}) + \hat{r}_k^{(c)} + \rho \\ l_{i_k} \leftarrow T_\theta(l_{i_k}, -\hat{r}_k^{(c)}) + \hat{r}_k^{(c)} + \rho \end{cases}, \quad (42)$$

where $$\hat{r}_k^{(c)} = \frac{1}{N} \sum_{n=1}^N \hat{r}_k^{(n)}$$

is the center of the reconstructed array before rotation and translation process, k'=1, 2, . . . , k, and $T_\theta$ represents a rotation operator with angle θ and centered at the origin. Because we have good initial values for the antenna locations, we can achieve a reasonable solution for (38), although the localization problem is non-convex.

Image Reconstruction

Given an estimated signal strength for an object, and updated object locations, we can reconstruct a sparse image of the ROI. Let $\bar{x}_5^{(n)}$ be an I×1 sparse vector with $$\bar{x}_5^{(n)}(i_{k'}) = \hat{x}_k^{(n)}(k'), \text{ for } k'=1,\ldots,k. \tag{43}$$

We then have a sparse image reconstruction $$\bar{x}_5 = \Sigma_{n=1}^N \bar{x}_5^{(n)}. \tag{44}$$

Although the sparse image represented in (44) exhibits a relatively high resolution in localizing objects, it does not include signature information about the object, which is very important for radar object recogniztion. In order to preserve object signature in the final autofocus radar image, we perform imaging on data with object signature included.

It is well known that a non-uniform array generally exhibits larger sidelobes than a uniform array of the same size in radar imaging. To improve imaging resolution and reduce radar image sidelobes, we first reconstruct the data on the ideal uniform arrays as follows $$\hat{y}_k^{(n)} = \Sigma_{k'=1}^k \hat{x}_{i_{k'}} \cdot \hat{\phi}_{i_{k'}} \circ \psi_{i_{k'}}^{(n)}. \tag{45}$$

Based on the reconstructed data, we then perform imaging using the conventional delay-and-sum imaging $$\bar{x}_6 = \Sigma_{n=1}^N \bar{x}_6^{(n)} = \Sigma_{n=1}^N (\Psi^{(n)})^H \hat{y}_k^{(n)}. \tag{46}$$

The frequency-domain residual signal for the $n^{th}$ antenna is determined by $$y_{res,k}^{(n)} = \tilde{y}^{(n)} - \hat{\Phi}_k^{(n)} \hat{x}_k^{(n)}, \tag{47}$$

and then the image is reconstructed using the residual data $$\hat{x}_k = \Sigma_{n=1}^N (\hat{\Psi}_k^{(n)})^H y_{res,k}^{(n)}, \tag{48}$$

where $\hat{\Psi}_k^{(n)}$ is a M×I matrix whose $i^{th}$ column determined using the same equation in (11) except that $r^{(n)}$ is replaced by newly updated antenna locations $\hat{r}_k^{(n)}$.

Method Summary

Figure 3:
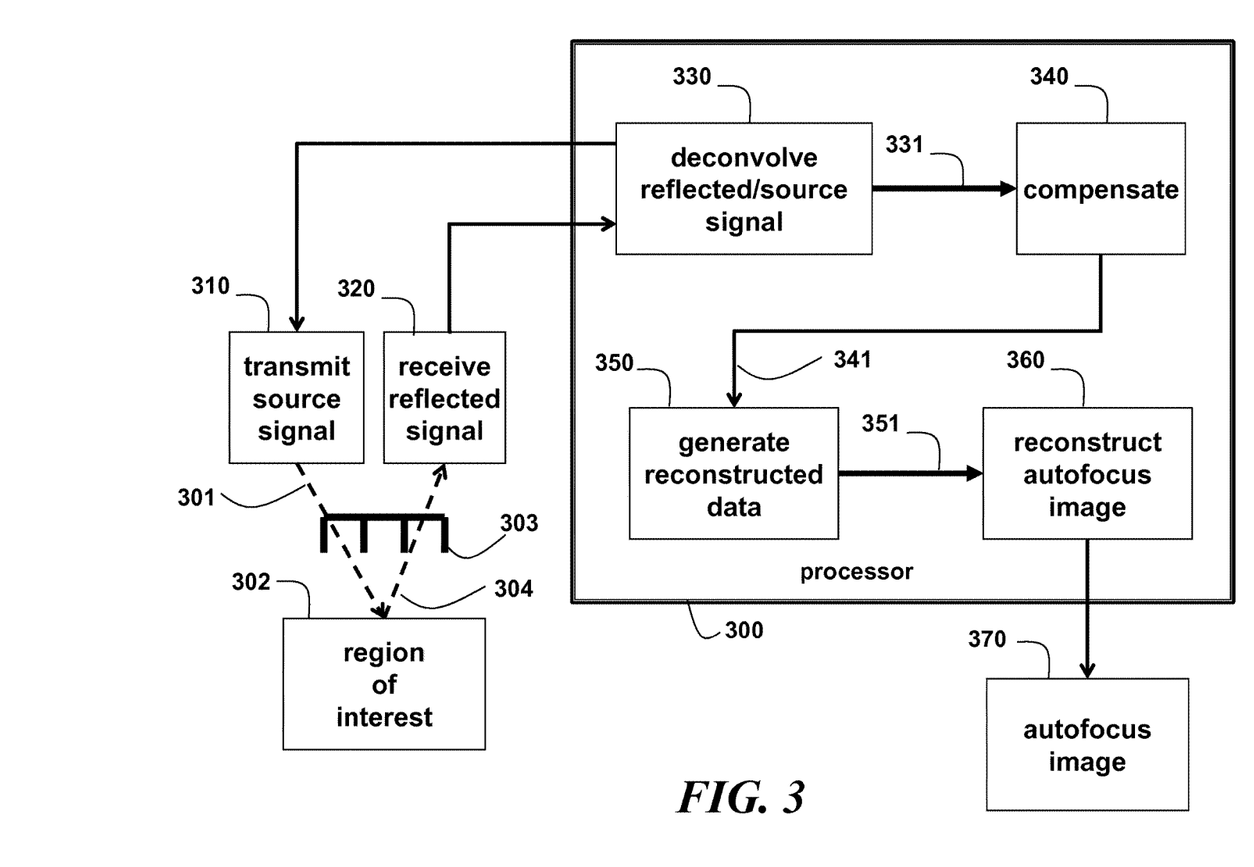
FIG. 3 is a schematic of a radar imaging system and method according to embodiments of the invention.

FIG. 3 shows the radar imaging method according to embodiments of our invention. Pulses 301, as a source signal, are transmitted 310 to the ROI 302 using the set of antennas 303 at different positions. Echoes 304, as a reflected signal, are received 320.

The reflected signal is convolved 330 with the source signal to produce deconvolved data 331. The deconvolved data are compensated 340 according a coherence in the received signal to produce compensated data 341. Reconstructed data 351 are generated 350 from the compensated data. Then, the autofocus image 370 is reconstructed 360 using the reconstructed data. The steps 330, 340, 350 and 360 can be performed in a processor 300 connected to memory, I/O interfaces, and the antennas by buses as known in the art.

Figure 4:
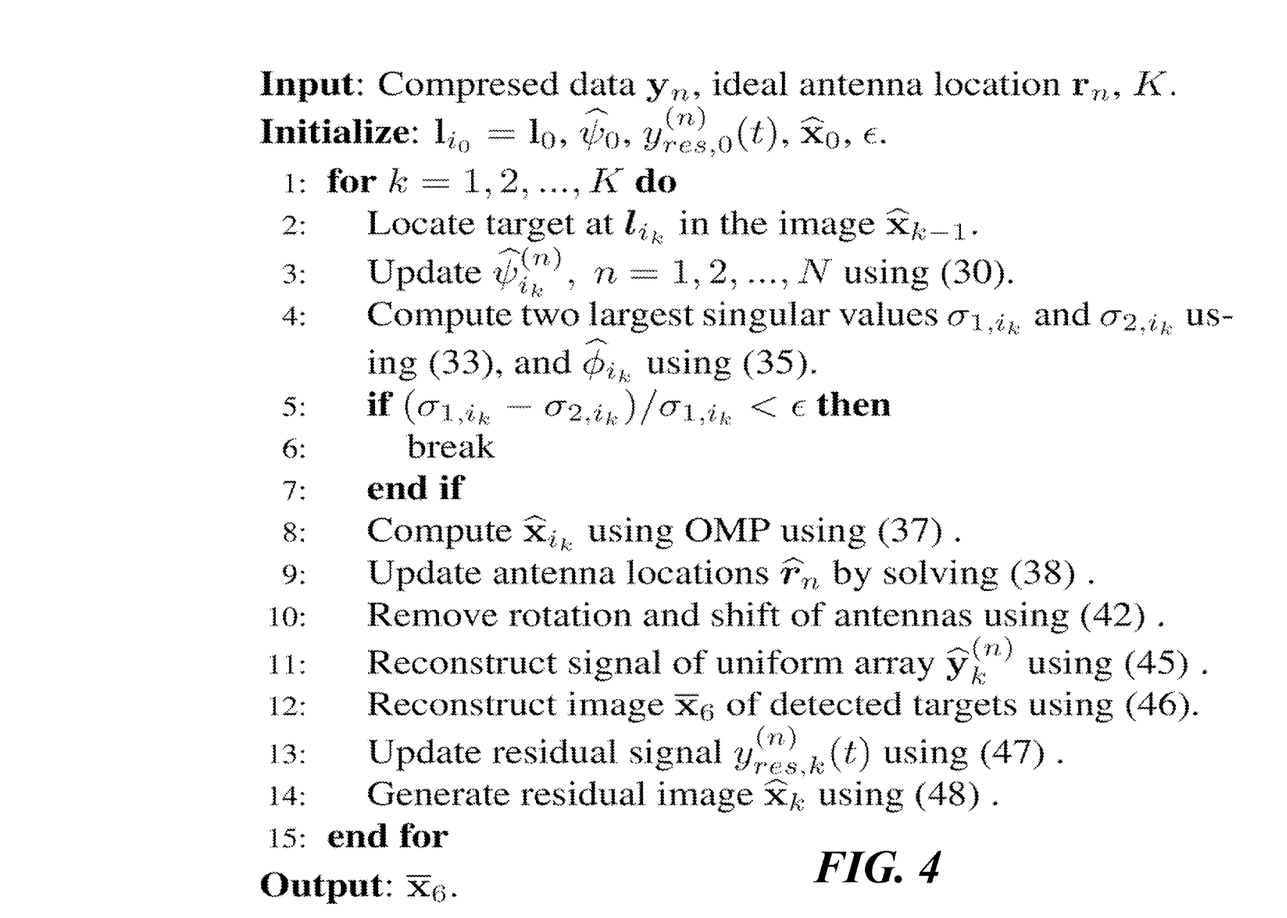
FIG. 4 is a block diagram of pseudo code for the radar imaging method according to embodiments of the invention.

FIG. 4 is block diagram of pseudo code for our AF Method. All variables and steps are described above.

Effect of the Invention

The invention provides a data-driven method to perform automatic radar focused imaging. The AF method is based on position error correction by exploiting data coherence and a spatial sparsity of the imaged area. The method has advantages in dealing with antenna array with position errors up to several wavelengths of center frequency, taking antenna radiation pattern and object signature into consideration. Imaging results with simulated noisy data demonstrate that the method significantly improved performance in imaging localized objects with only several iterations. Because our method concurrently performs imaging and antenna position estimation, it can also be applied to image natural scene.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for generating an image of a region of interest (ROI) using a radar system, wherein the radar system includes a set of one or more antennas, and the radar system has unknown position perturbations, comprising steps of:
   transmitting pulses, as a source signal, to the ROI using the set of antennas at different positions;
   receiving echoes, as reflected signals, by the set of antennas at the different positions; and further comprising computer implemented steps of:
   deconvolving the reflected signals with the source signal to produce deconvolved data;
   compensating phase changes of the deconvolved data according a coherence between the reflected signals to produce compensated data;
   generating reconstructed data from the compensated data; and
   reconstructing images using the reconstructed data, wherein the images are autofocused, wherein the deconvolved data are initialized as a residual signal, wherein the images include pixels corresponding to location in the ROI, wherein the computer implemented steps further comprise, until a termination condition is reached, iterative steps of:
      estimating the target location, as non-zero support across the images, each of which corresponding to one of the antennas;
      updating projection matrices based on coherence analysis and group sparsity;
      reconstructing the images with the updated projection matrices; and
      determining the residual signal for a next iteration by removing the target signal from the collected data.

2. The method of claim 1, wherein the position perturbations are unknown.

3. The method of claim 1, wherein the position perturbations are up to 10 wavelengths.

4. The method of claim 1, wherein the images are of localized objects in the ROI.

5. The method of claim 1, wherein the set of antennas form a uniform array.

6. The method of claim 1, wherein each image corresponds to an antenna position, and further comprising:
   generating a final image as a coherent sum of the images.

7. The method of claim 1, wherein the images share locations of objects in the ROI.

8. The method of claim 1, wherein the projection matrices are different for different antennas.

9. The method of claim 1, wherein the projection matrices are coherent with position error compensation.

* * * * *